(12) United States Patent
Sasaki et al.

(10) Patent No.: US 11,694,485 B2
(45) Date of Patent: Jul. 4, 2023

(54) INFORMATION PROCESSING DEVICE, INFORMATION PROCESSING METHOD, MOBILE TERMINAL, AND STORAGE MEDIUM

(71) Applicant: TOYOTA JIDOSHA KABUSHIKI KAISHA, Toyota (JP)

(72) Inventors: Akira Sasaki, Miyoshi (JP); Jun Hioki, Nagakute (JP); Kazuki Matsumoto, Oogaki (JP); Fumio Wada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 475 days.

(21) Appl. No.: 16/930,918

(22) Filed: Jul. 16, 2020

(65) Prior Publication Data

US 2021/0035379 A1 Feb. 4, 2021

(30) Foreign Application Priority Data

Aug. 1, 2019 (JP) ................................ 2019-142049

(51) Int. Cl.
*G07C 5/00* (2006.01)
*H04W 4/44* (2018.01)
*G07C 5/08* (2006.01)
*H04W 4/029* (2018.01)

(52) U.S. Cl.
CPC ........... *G07C 5/008* (2013.01); *G07C 5/0808* (2013.01); *G07C 5/0816* (2013.01); *H04W 4/029* (2018.02); *H04W 4/44* (2018.02)

(58) Field of Classification Search
CPC .... G07C 5/008; G07C 5/0808; G07C 5/0816; G07C 2205/02; G07C 5/0825; H04W 4/029; H04W 4/44; H04W 4/90; H04W 4/80; H04W 4/40; B60R 21/00
See application file for complete search history.

(56) References Cited

U.S. PATENT DOCUMENTS 9,432,828 B1 * 8/2016 Tu ..................... H04M 1/72421

FOREIGN PATENT DOCUMENTS

| JP | 5802358 B2 | 10/2015 |
| JP | 2016-030481 A | 3/2016 |
| JP | 2019-003487 A | 1/2019 |

* cited by examiner

*Primary Examiner* — Michael V Kerrigan
(74) *Attorney, Agent, or Firm* — Oliff PLC (57) ABSTRACT

An information processing device mounted on a vehicle includes a processor configured to: send abnormality occurrence information to a predetermined server through a first communication unit when an occurrence of an abnormality is detected in the vehicle, the abnormality occurrence information indicating the occurrence of the abnormality, the first communication unit being mounted on the vehicle and configured to perform communication via a base station using a first communication method; and send a proxy sending request to a terminal around the vehicle through a second communication unit when communication with the predetermined server cannot be performed through the first communication unit, the proxy sending request being a request to send the abnormality occurrence information to the predetermined server in proxy mode, the second communication unit being mounted on the vehicle and configured to perform communication using a second communication method that allows for terminal-to-terminal direct communication.

18 Claims, 6 Drawing Sheets

INFORMATION PROCESSING DEVICE, INFORMATION PROCESSING METHOD, MOBILE TERMINAL, AND STORAGE MEDIUM

INCORPORATION BY REFERENCE

The disclosure of Japanese Patent Application No. 2019-142049 filed on Aug. 1, 2019 including the specification, drawings and abstract is incorporated herein by reference in its entirety.

BACKGROUND

1. Technical Field

The disclosure relates to an information processing device, an information processing method, a mobile terminal, and a storage medium.

2. Description of Related Art

A vehicle accident notification system is disclosed in which, when the occurrence of a vehicle accident is detected, an in-vehicle device sends an emergency notification to an external management server (for example, Japanese Unexamined Patent Application Publication No. 2016-030481 (JP 2016-030481A)).

SUMMARY

However, according to the vehicle accident notification system described above, when the function of the in-vehicle device to communicate with the management server is physically damaged due to an accident or when the in-vehicle device is out of the communication range of the wireless communication method used for communication with the management server, the in-vehicle device cannot communicate with the management server. In such a case, there is a possibility that an emergency notification cannot be sent.

The present disclosure provides an information processing device, an information processing method, a mobile terminal, and a program that enable emergency notification even when communication with an external server cannot be performed.

An information processing device according to a first aspect of the present disclosure is mounted on a vehicle. The information processing device includes a processor configured to: send abnormality occurrence information to a predetermined server through a first communication unit when an occurrence of an abnormality is detected in the vehicle, the abnormality occurrence information indicating the occurrence of the abnormality, the first communication unit being mounted on the vehicle and configured to perform communication via a base station using a first communication method; and send a proxy sending request to a terminal around the vehicle through a second communication unit when communication with the predetermined server cannot be performed through the first communication unit, the proxy sending request being a request to send the abnormality occurrence information to the predetermined server in proxy mode, the second communication unit being mounted on the vehicle and configured to perform communication using a second communication method that allows for terminal-to-terminal direct communication.

A information processing method according to a second aspect of the present disclosure includes: sending, by a computer mounted on a vehicle, abnormality occurrence information to a predetermined server through a first communication unit when an occurrence of an abnormality is detected in the vehicle, the abnormality occurrence information indicating the occurrence of the abnormality, the first communication unit being mounted on the vehicle and configured to perform communication via a base station using a first communication method: and sending, by the computer, sending a proxy sending request to a terminal around the vehicle through a second communication unit when communication with the predetermined server cannot be performed through the first communication unit, the proxy sending request being a request to send the abnormality occurrence information to the predetermined server in proxy mode, the second communication unit being mounted on the vehicle and configured to perform communication using a second communication method that allows for terminal-to-terminal direct communication.

A terminal according to a third aspect of the present disclosure includes: a first wireless communication unit configured to perform communication using a first communication method via a base station; a second wireless communication unit configured to perform communication using a second communication method that allows for terminal-to-terminal direct communication; and a processor configured to receive a proxy sending request from an in-vehicle device through the second wireless communication unit, the proxy sending request being a request to send abnormality occurrence information to a predetermined server in proxy mode, the abnormality occurrence information indicating an occurrence of an abnormality in a vehicle on which the in-vehicle device is mounted, and send the abnormality occurrence information to the predetermined server through the first wireless communication unit.

A non-transitory storage medium according to a fourth aspect of the present disclosure stores instructions that are executable by one or more processors and that cause the one or more processors to perform functions including: receiving a proxy sending request from an in-vehicle device through a second wireless communication unit, the proxy sending request being a request to send abnormality occurrence information to a predetermined server in proxy mode, the abnormality occurrence information indicating an occurrence of an abnormality in a vehicle on which the in-vehicle device is mounted, the second wireless communication unit being configured to perform communication using a second communication method that allows for terminal-to-terminal direct communication; and sending the abnormality occurrence information to the predetermined server through a first wireless communication unit, the first wireless communication unit being configured to perform communication using a first communication method via a base station.

The present disclosure enables emergency notification even when communication with the external server cannot be performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One aspect of the present disclosure is an information processing device mounted on a vehicle. In addition to the information processing device, the vehicle includes a first communication unit and a second communication unit. The first communication unit performs communication via a base station using a first communication method. The second communication unit performs communication using a second communication method that allows terminals to directly communicate with each other. The information processing device includes a processor that, when the occurrence of an abnormality is detected in the vehicle, sends the abnormality occurrence information, which indicates the occurrence of the abnormality, to a predetermined server through the first communication unit. When communication cannot be performed with the predetermined server through the first communication unit, the processor sends a proxy sending request to a terminal around the vehicle through the second communication unit for requesting the terminal to send the abnormality occurrence information to the predetermined server in proxy mode.

The second communication method may be performed by any one of inter-vehicle communication, Wi-Fi ad hoc mode, Bluetooth (registered trademark), and Bluetooth (registered trademark) Low Energy (BLE).

The first communication unit and the second communication unit may be provided in the same housing as the information processing device or may be provided at a different position in the same vehicle independently of the information processing device. The first communication method may be performed by any one of the mobile communication methods conforming to 5G (Generation), 4G, Long Term Evolution (LTE), 3G, or a generation later than 5G. The first communication method includes, but not limited to, those described above. A terminal around the vehicle may be a terminal that can communicate using the first communication method or the second communication method. These terminals may be any one of a smartphone, a tablet terminal, a wearable terminal, and an in-vehicle device.

Vehicle abnormalities include, for example, a collision with another vehicle or a pedestrian or with a building, an accident such as a fall and an overturn, the physical abnormality of occupants including the driver, and a parts failure that prevents normal driving. For example, when the first communication unit is physically damaged by an accident or is out of the communication range of the first communication method, the information processing device cannot communicate with the predetermined server. According to one aspect of the present disclosure, when the occurrence of a vehicle abnormality is detected with the result that communication with the predetermined server cannot be performed through the first communication unit, the information processing device uses the second communication method, in which terminals can be directly connected to each other, to request a terminal around the vehicle to send the abnormality occurrent information in proxy mode. For example, the terminal around the vehicle sends the abnormality occurrence information to the predetermined server in proxy mode, making it possible to notify the predetermined server of the occurrence of the vehicle abnormality. Upon receiving the abnormality occurrence information, the predetermined server can perform processing to rescue the occupants, for example, by sending an emergency vehicle to the vehicle.

An embodiment of the present disclosure will be described below with reference to the drawings. Note that the configuration of the following embodiment is an example and that the present disclosure is not limited to the configuration of the embodiment.

First Embodiment

Figure 1:
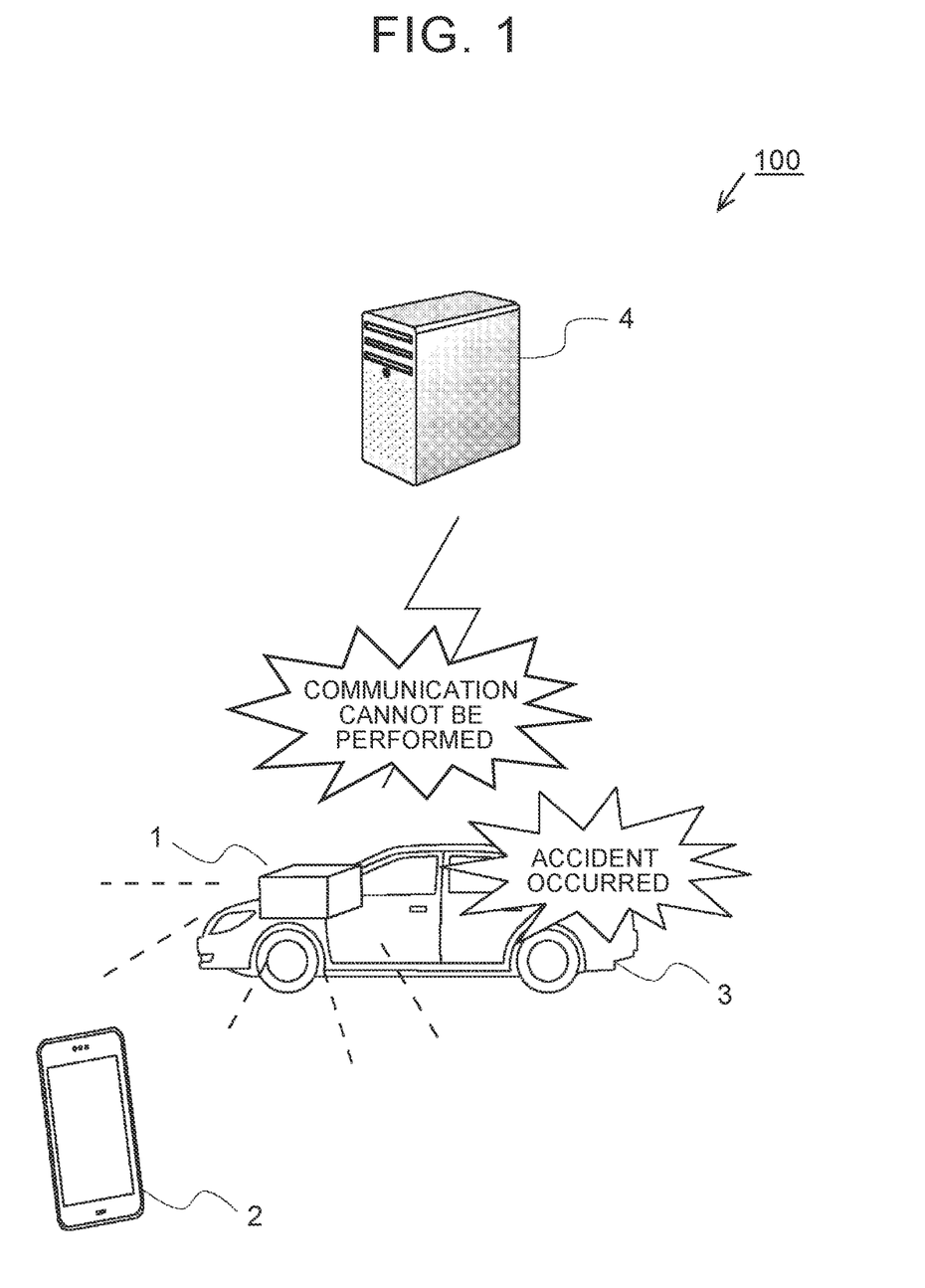
FIG. 1 is a diagram showing an example of a system configuration of a vehicle abnormality notification system according to a first embodiment.

FIG. 1 is a diagram showing an example of the system configuration of a vehicle abnormality notification system 100 according to a first embodiment. The vehicle abnormality notification system 100 is a system that, when an abnormality is detected in a vehicle, automatically notifies about the abnormality. Abnormalities in a vehicle that are notified by the vehicle abnormality notification system 100 include, for example, an accident in which the vehicle itself is involved, a failure to travel due to defective vehicle parts, and abnormal conditions of an occupant in the vehicle. Note that the abnormalities in a vehicle are not limited to those described above.

The vehicle abnormality notification system 100 includes, for example, an in-vehicle device 1 mounted on each of the plurality of vehicles 3, a mobile terminal 2, and a center server 4. The vehicle 3 may be a manual driving vehicle or an autonomous driving vehicle. The in-vehicle device 1 may be any of a data communication device or a device of a car navigation system that is mounted on the vehicle or, when the vehicle 3 is an autonomous driving vehicle, a control device that controls autonomous driving. The in-vehicle device 1 connects to a public network, such as the Internet, through mobile communication conforming to the communication standard such as 5G, Long Term Evolution (LTE), 3G, or the like. In addition, the in-vehicle device 1 is capable of wireless communication in which terminals are connected, not via a base station, but directly to each other, for example, via Bluetooth (registered trademark), BLE, or WiFi ad hoc mode.

The mobile terminal 2 may be a mobile terminal carried by an occupant of the vehicle 3 or a mobile terminal carried by an occupant of another vehicle or by a pedestrian. Instead of the mobile terminal 2, another in-vehicle device mounted in the vehicle 3 or in another vehicle may also be used. The mobile terminal 2 is a terminal on which the terminal application of the vehicle abnormality notification system 100 is installed and, at the same time, is capable of wireless communication in which the terminals are connected, not via a base station, but directly to each other. The mobile terminal 2 connects to a base station through mobile communication conforming to the communication standard such as 5G, Long Term Evolution (LTE), 3G, or the like and, via the base station, connects to a public network such as the Internet. The mobile terminal 2 is capable of communication in which terminals are connected, not via a base station, but directly to each other, via short-range wireless communication such as Bluetooth (registered trademark) or BLE or via WiFi ad hoc mode. In the description below, communication in which terminals are connected, not via a base station, but directly to each other, is referred to as terminal-to-terminal direct communication.

The center server 4 is connected to a network such as the Internet. The center server 4, each of the in-vehicle devices 1, and mobile terminal 2 can communicate with each other via the network.

In the first embodiment, the in-vehicle device 1 detects an abnormality in the vehicle 3 based on the detection values of various sensors provided in the vehicle 3. In the first embodiment, an abnormality in the vehicle 3 detected by the in-vehicle device 1 is assumed to be an accident such as a collision with another vehicle or with a building, or a fall, an overturn, or submersion of the vehicle 3. To detect an abnormality based on the detection values of the sensors, any of the known techniques may be used. In addition, the in-vehicle device 1 may detect an abnormality in the vehicle 3, for example, by an input operation by an occupant of the vehicle 3.

The in-vehicle device 1 generates abnormality occurrence information, which notifies the center server 4 of the occurrence of an abnormality in the vehicle 3, and sends the generated information to the center server 4. At this time, when communication with the center server 4 cannot be performed, the in-vehicle device 1 starts terminal-to-terminal direct communication to send the abnormality occurrence information to the mobile terminal 2 around the vehicle through terminal-to-terminal direct communication. The abnormality occurrence information includes, for example, the details of the abnormality in the vehicle 3, the position information on the vehicle 3, the time when the abnormality in the vehicle 3 was detected, and the information on the vehicle 3.

In the mobile terminal 2, the terminal-to-terminal direct communication function is activated in advance and, in addition, the terminal application of the vehicle abnormality notification system 100 is activated. When the abnormality occurrence information sent from the in-vehicle device 1 through terminal-to-terminal direct communication is received, the mobile terminal 2 sends the received abnormality occurrence information to the center server 4 in proxy mode through the mobile communication.

When the abnormality occurrence information is received, the center server 4 notifies a predetermined report destination, such as the fire department or the police station, in accordance with details of the abnormality in the vehicle 3 indicated by the abnormality occurrence information. This allows an ambulance, a fire truck, or a police vehicle to be dispatched to the location of the vehicle 3 to rescue the occupants of the vehicle 3 and those involved in the accidents of the vehicle 3. Mobile communication is an example of "communication using the first communication method". Terminal-to-terminal direct communication is an example of "communication using the second communication method".

Figure 2:
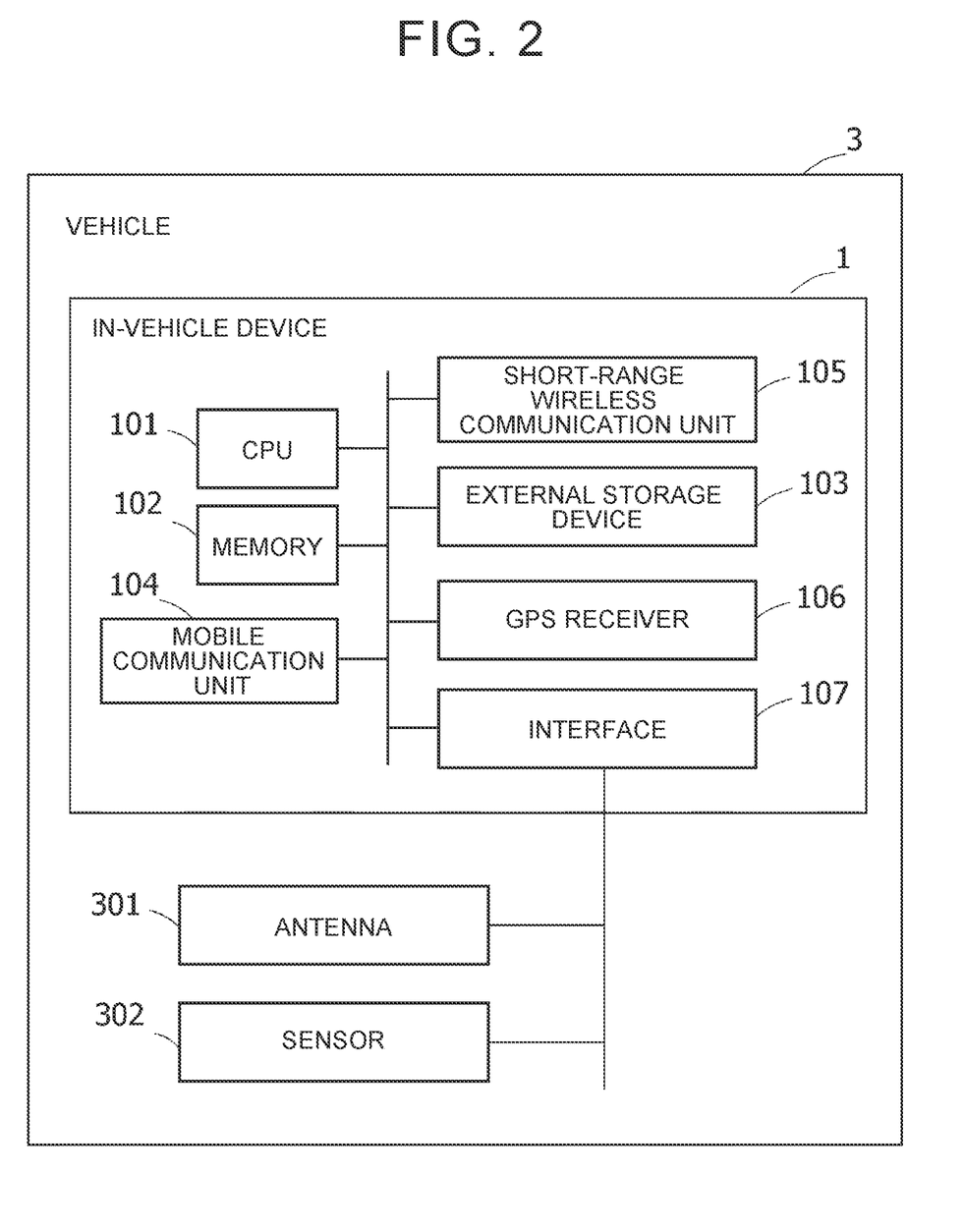
FIG. 2 is a diagram showing an example of a hardware configuration of an in-vehicle device.

FIG. 2 is a diagram showing an example of a hardware configuration of the in-vehicle device 1. The in-vehicle device 1 is, for example, a data communication device or a car navigation device mounted on the vehicle 3 or an on-board ETC device. When the vehicle is an autonomous driving vehicle, the in-vehicle device 1 may be an autonomous driving control device having the communication function for connection to a public network such as the Internet. Note that the in-vehicle device 1 is not limited to those described above. For example, as long as it is possible to acquire the detection values of the sensors mounted on the vehicle 3 and, based on the detection values of the sensors, to detect an abnormality in the vehicle 3, the in-vehicle device 1 may be a mobile terminal such as a smartphone, a tablet terminal, or a wearable terminal, carried by a user in the vehicle 3. In the description of the first embodiment below, the in-vehicle device 1 is assumed to be a data communication device mounted on the vehicle 3. The in-vehicle device 1 is an example of the "information processing device".

The in-vehicle device 1 includes a CPU 101, a memory 102, an external storage device 103, a mobile communication unit 104, a short-range wireless communication unit 105, a Global Positioning System (GPS) receiver 106, and an interface 107 as the hardware components.

The external storage device 103 stores various programs and data used by the CPU 101 when executing the programs. The external storage device 103 is, for example, an Erasable Programmable ROM (EPROM), or a hard disk drive. The programs stored in the external storage device 103 include, for example, the operating system (OS), the control program of the vehicle abnormality notification system 100, and various other application programs. The control program of the vehicle abnormality notification system 100 is a program that, when an abnormality is detected in the vehicle 3, notifies the center server 4 of the abnormality.

The memory 102 is a storage device that provides the CPU 101 with a storage area for loading a program from the external storage device 103, a work area used for executing the loaded program, or a buffer. The memory 102 includes, for example, a semiconductor memory such as a read only memory (ROM) and a random access memory (RAM).

The CPU 101 loads the OS and various application programs from the external storage device 103 into the memory 102 for execution to perform various processing. One or more CPUs 101 may be provided. The CPU 101 is an example of the "processor" of the "information processing device".

The mobile communication unit 104 is a wireless communication circuit for mobile communication conforming to the standard such as 5G, LTE, LTE-Advanced (4G), 3G, or the like. The mobile communication unit 104 connects, through wireless communication, to an access network supporting the corresponding wireless communication method, connects to a public network through the access network, and connects to the center server 4 through the public network. The mobile communication unit 104, which supports a plurality of mobile communication methods, may perform communication while switching among various communication standards, for example, in the priority order of 5G, 4G, and 3G, according to the surrounding radio wave environment. The mobile communication unit 104 is an example of the "first communication unit".

The short-range wireless communication unit 105 is, for example, a wireless communication circuit supporting a short-range wireless communication method such as Bluetooth (registered trademark) and BLE. In the first embodiment, Bluetooth (registered trademark) is used for terminal-to-terminal direct communication and, therefore, the short-range wireless communication unit 105 is assumed to perform communication using Bluetooth (registered trademark). Note that the communication method used by the short-range wireless communication unit 105 is not limited to Bluetooth; for example, inter-vehicle communication (V2V communication), dedicated short range communication (DSRC), or the like may also be used. Furthermore, instead of the short-range wireless communication unit 105, the in-vehicle device 1 may include a communication unit that performs communication in the WiFi ad hoc mode. The short-range wireless communication unit 105 is an example of the "second communication unit".

The GPS receiver 106 receives radio waves of time signals from a plurality of artificial satellites orbiting the earth and stores the received signals in the register provided in CPU 101. The CPU 101 calculates the latitude and the longitude, which indicate a position on the earth, based on the detection signals from the GPS receiver 106 to acquire the position information on the vehicle 3 (in-vehicle device 1).

The interface 107 is an interface for connection to other devices provided in the vehicle 3. For example, through the interface 107, the in-vehicle device 1 is connected to the antenna 301 and the sensor 302. The interface 107 may be connected to other devices in the vehicle 3 directly by a cable or may be connected to the in-vehicle network (CAN: Controller Area Network) and, through the CAN, to other devices.

The antenna 301 is, for example, an antenna for communication via the mobile communication method. The sensor 302 is a sensor that detects an abnormality in the vehicle 3. The sensor 302 includes one or more of the collision sensor, ultrasonic sensor, external camera, internal camera, and acceleration sensor. Note that the sensor 302 is not limited to those sensors and cameras.

The hardware configuration of the in-vehicle device 1 shown in FIG. 2 is an example and the present disclosure is not limited to this configuration. That is, components may be omitted, replaced, or added as appropriate according to the embodiment. For example, the in-vehicle device 1 may include a portable recording medium driving device so that a program recorded on a portable recording medium can be executed. The portable recording medium is a recording medium such as an SD card, a mini-SD card, a micro-SD card, a universal serial bus (USB) flash memory, a compact disc (CD), a digital versatile disc (DVD), a Blu-ray (registered trademark) disc, or a flash memory card. In addition to the components described above, the in-vehicle device 1 may include an input device and an output device. The input device is, for example, a touch panel or the like. The output device is, for example, a display or the like.

Next, the mobile terminal 2 is a smartphone, a tablet terminal, a wearable terminal, a mobile phone terminal, or the like. The mobile terminal 2 includes a CPU, a memory, an external storage device, a mobile communication unit, and a short-range wireless communication unit as the hardware components. Since these components are the same as those described above, the illustration of the hardware configuration of the mobile terminal 2 is omitted. Note that the mobile terminal 2 stores the terminal control program of the vehicle abnormality notification system 100 in the external storage device. While the terminal control program of the vehicle abnormality notification system 100 is activated, the short-range wireless communication unit of the mobile terminal 2 is also activated to wait for receiving the short-range wireless communication signal. In the first embodiment, the short-range wireless communication unit of the mobile terminal 2 performs communication via Bluetooth (registered trademark) in the same way as the short-range wireless communication unit of the in-vehicle device 1. In addition to the components described above, the mobile terminal 2 includes a touch panel display, a speaker, a microphone, and other sensors. The CPU of the mobile terminal 2 is an example of the "processor" of the "terminal". The mobile communication unit of the mobile terminal 2 is an example of the "first wireless communication unit".

The short-range wireless communication unit of the mobile terminal 2 is an example of the "second wireless communication unit".

The series of processing performed by the in-vehicle device 1 and the mobile terminal 2 is achieved not only by software executed by the processor. The series of processing may also be achieved by hardware such as a field-programmable gate array (FPGA).

Figure 3:
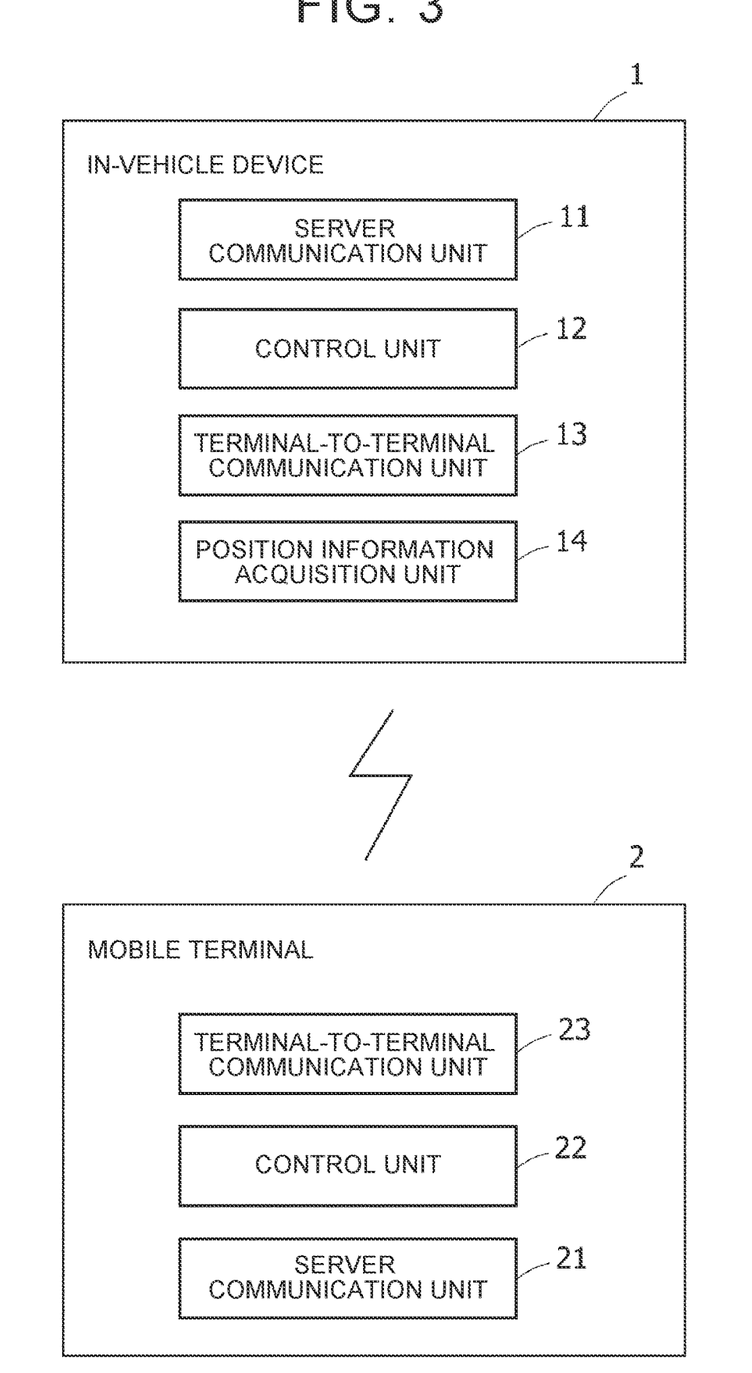
FIG. 3 is a diagram showing an example of a functional configuration of the in-vehicle device and a mobile terminal in the vehicle abnormality notification system.

FIG. 3 is a diagram showing an example of the functional configuration of the in-vehicle device 1 and the mobile terminal 2 in the vehicle abnormality notification system 100. First, the functional configuration of the in-vehicle device 1 will be described. The in-vehicle device 1 includes a server communication unit 11, a control unit 12, a terminal-to-terminal communication unit 13, and a position information acquisition unit 14 as the functional components. The server communication unit 11, control unit 12, terminal-to-terminal communication unit 13, and position information acquisition unit 14 are implemented, for example, when the CPU 101 of the in-vehicle device 1 executes the control program for the in-vehicle device 1 in the vehicle abnormality notification system 100. This control program is stored in the external storage device 103.

The server communication unit 11 is an interface for communication with the center server 4. Communication with the center server 4 is performed through the mobile communication unit 104. For example, the server communication unit 11 receives an input of abnormality occurrence information from the control unit 12 and sends the information to the center server 4. In addition, the server communication unit 11 monitors the state of the mobile communication unit 104. The state of the mobile communication unit 104 indicates, for example, whether the mobile communication unit 104 is normal and whether the mobile communication unit 104 is within the communication range.

The terminal-to-terminal communication unit 13 is an interface for direct communication with another terminal. Direct communication with another terminal is performed in the first embodiment through the short-range wireless communication unit 105. For example, the terminal-to-terminal communication unit 13 receives, from the control unit 12, an input of a proxy sending request to send the abnormality occurrence information and, then, sends the request to another terminal through the short-range wireless communication unit 105.

The position information acquisition unit 14 acquires the position information on the vehicle 3 (in-vehicle device 1), acquired by the GPS receiver 106 of the in-vehicle device 1, at a predetermined cycle and outputs the acquired position information to a predetermined storage area in the memory 102. The storage area in the memory 102 is overwritten for updating the position information. The control unit 12 accesses the storage area in the memory 102 to acquire the position information. The position information on the vehicle 3 is represented, for example, by latitude and longitude. The position information on the vehicle 3 may be an address. The cycle at which the position information acquisition unit 14 acquires the position information may be set in the range of 0.1 seconds to 10 seconds. Note that the cycle is not limited to this range.

The control unit 12 detects the occurrence of an abnormality in the vehicle 3 based, for example, on the detection value of the sensor 302 provided in the vehicle 3. The method for detecting an abnormality in the vehicle 3 based on the detection value of the sensor 302 is not limited to a specific method but any known method may be used. The detection of an abnormality in the vehicle 3 may also be based, for example, on an input operation by an occupant of the vehicle 3.

When the occurrence of an abnormality is detected in the vehicle 3, the control unit 12 generates the abnormality occurrence information. The abnormality occurrence information includes, for example, the position information on the vehicle 3, the abnormality detection time, the abnormality details, and the like. The control unit 12 reads the position information on the vehicle 3, which is to be included in the abnormality occurrence information, from the predetermined storage area in the memory 102. The abnormality details are included in the abnormality occurrence information, for example, when the occurrence of the abnormality in the vehicle 3 is determined based on the detection value of the sensor 302.

The control unit 12 acquires the state of the mobile communication unit 104 from the server communication unit 11. When the state indicates that the mobile communication unit 104 is normal and that the mobile communication unit 104 is within the communication range, the control unit 12 detects that the mobile communication unit 104 can communicate with the center server 4 and outputs the abnormality occurrence information to the server communication unit 11. The abnormality occurrence information is sent to the center server 4 by the server communication unit 11 via the mobile communication unit 104.

Conversely, when the state indicates that the mobile communication unit 104 is not normal or the mobile communication unit 104 is out of the communication range, the control unit 12 detects that the mobile communication unit 104 cannot communicate with the center server 4. In this case, the control unit 12 instructs the terminal-to-terminal communication unit 13 to search for a mobile terminal. For example, the mobile terminal is a mobile terminal around the vehicle 3. When the mobile terminal 2 capable of terminal-to-terminal direct communication is detected around the vehicle 3, the control unit 12 outputs the abnormality occurrence information and a proxy sending request to the terminal-to-terminal communication unit 13. The abnormality occurrence information and the proxy sending request are sent to the detected mobile terminal 2 by the terminal-to-terminal communication unit 13 through the short-range wireless communication unit 105.

Next, the functional configuration of the mobile terminal 2 will be described. The mobile terminal 2 includes a server communication unit 21, a control unit 22, and a terminal-to-terminal communication unit 23 as the functional components. These functional units are implemented, for example, when the CPU of the mobile terminal 2 executes the control program for the mobile terminal 2 in the vehicle abnormality notification system 100. This control program is stored in the external storage device.

The server communication unit 21 is an interface for communication with the center server 4. Communication with the center server 4 is performed in the mobile terminal 2 through the mobile communication unit as in the in-vehicle device 1. For example, the server communication unit 21 receives an input of the abnormality occurrence information from the control unit 22 and sends the received information to the center server 4.

The terminal-to-terminal communication unit 23 is an interface for performing terminal-to-terminal direct communication with another terminal. Direct communication with another terminal is performed in the first embodiment through the short-range wireless communication unit in the mobile terminal 2 as in the in-vehicle device 1. For example, the terminal-to-terminal communication unit 23 receives abnormality occurrence information and a proxy sending request, received from the in-vehicle device 1, through the short-range wireless communication unit and outputs the received abnormality occurrence information and the proxy sending request to the control unit 22.

When an input of the abnormality occurrence information and the proxy sending request is received from the terminal-to-terminal communication unit 23, the control unit 22 outputs the abnormality occurrence information to the server communication unit 21. The abnormality occurrence information is sent to the center server 4 by the server communication unit 21.

The functional configuration of each of the in-vehicle device 1 and the mobile terminal 2 is not limited to that shown in FIG. 3.

Processing Flow

Figure 4:
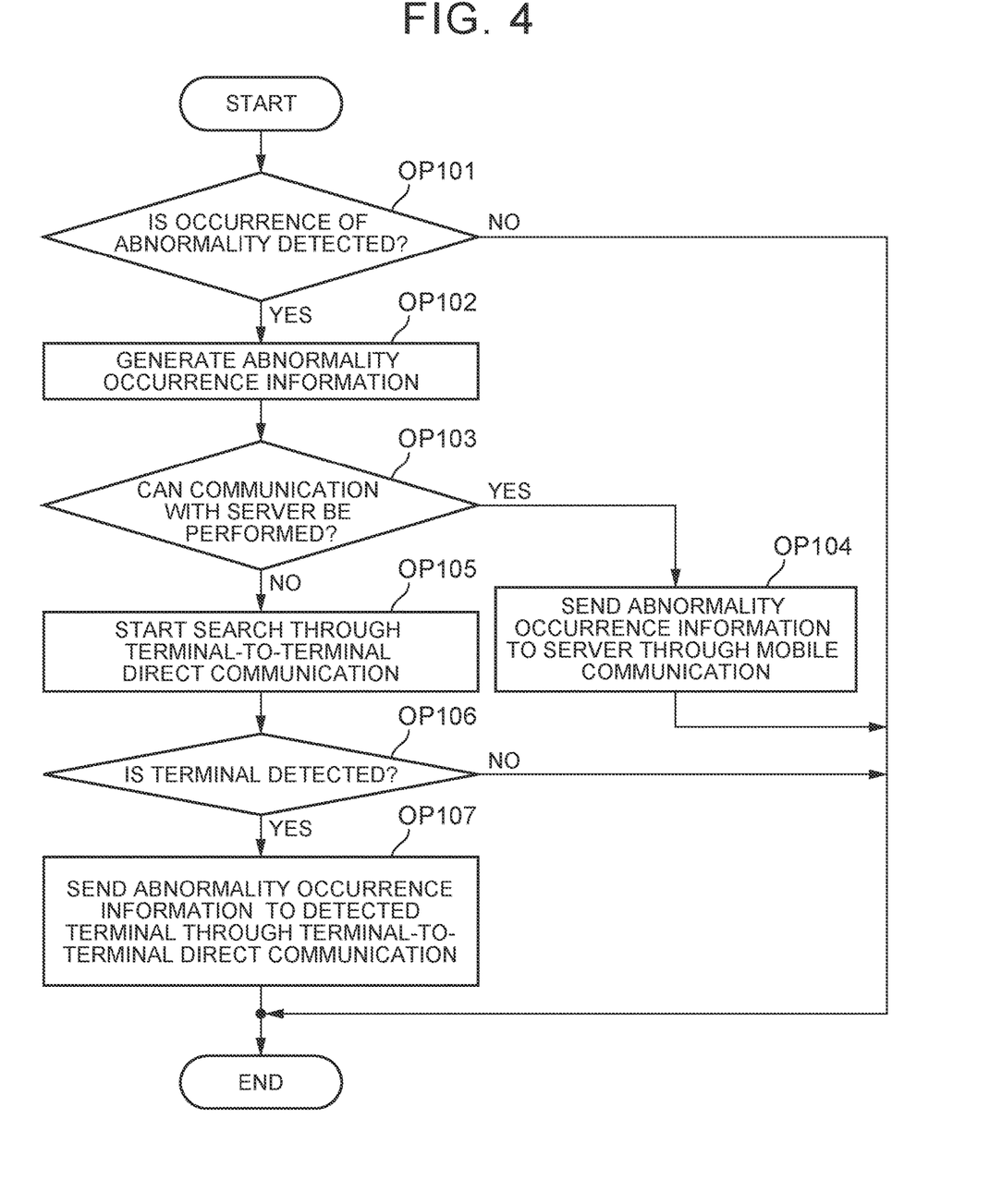
FIG. 4 is an example of a flowchart of processing of the in-vehicle device according to the first embodiment.

FIG. 4 is an example of the flowchart of the processing of the in-vehicle device 1 according to the first embodiment. The processing shown in FIG. 4 is repeatedly performed at a predetermined cycle while the in-vehicle device 1 is operating. Although the processing shown in FIG. 4 is performed by the CPU 101 of the in-vehicle device 1, the processing is described as being performed by the functional components for the convenience of description.

In OP101, the control unit 12 determines whether the occurrence of an abnormality in the vehicle 3 is detected. When the occurrence of an abnormality in the vehicle 3 is detected (OP101: YES), the processing proceeds to OP102. When an abnormality is not detected in the vehicle 3 (OP101: NO), the processing shown in FIG. 4 is terminated.

In OP102, the control unit 12 generates the abnormality occurrence information. In OP103, the control unit 12 determines whether communication with the center server 4 can be performed. When the communication with the center server 4 can be performed (OP103: YES), the processing proceeds to OP104. In OP104, the control unit 12 outputs the abnormality occurrence information to the server communication unit 11 and, through the mobile communication unit 104, sends the abnormality occurrence information to the center server 4. After that, the processing shown in FIG. 4 is terminated.

When communication with the center server 4 cannot be performed (OP103: NO), the processing proceeds to OP105. In OP105, the control unit 12 instructs the terminal-to-terminal communication unit 13 to perform the terminal search processing. The terminal-to-terminal communication unit 13 causes the short-range wireless communication unit 105 to search for a mobile terminal.

In OP106, the control unit 12 determines whether the mobile terminal 2 is detected around the vehicle 3. When the mobile terminal 2 is detected around the vehicle 3 (OP106: YES), the processing proceeds to OP107. When the mobile terminal 2 is not detected around the vehicle 3 (OP106: NO), the processing shown in FIG. 4 is terminated.

In OP107, the control unit 12 outputs the abnormality occurrence information and a proxy sending request to the terminal-to-terminal communication unit 13. Then, via the terminal-to-terminal communication unit 13, the control unit 12 sends the abnormality occurrence information and the proxy sending request to the detected mobile terminal 2 around the vehicle 3 via the short-range wireless communication unit 105 through terminal-to-terminal direct communication. After that, the processing shown in FIG. 4 is terminated. The abnormality occurrence information is sent to the center server 4 by the mobile terminal 2 that has received the abnormality occurrence information. After that, the processing shown in FIG. 4 is terminated.

Figure 5:
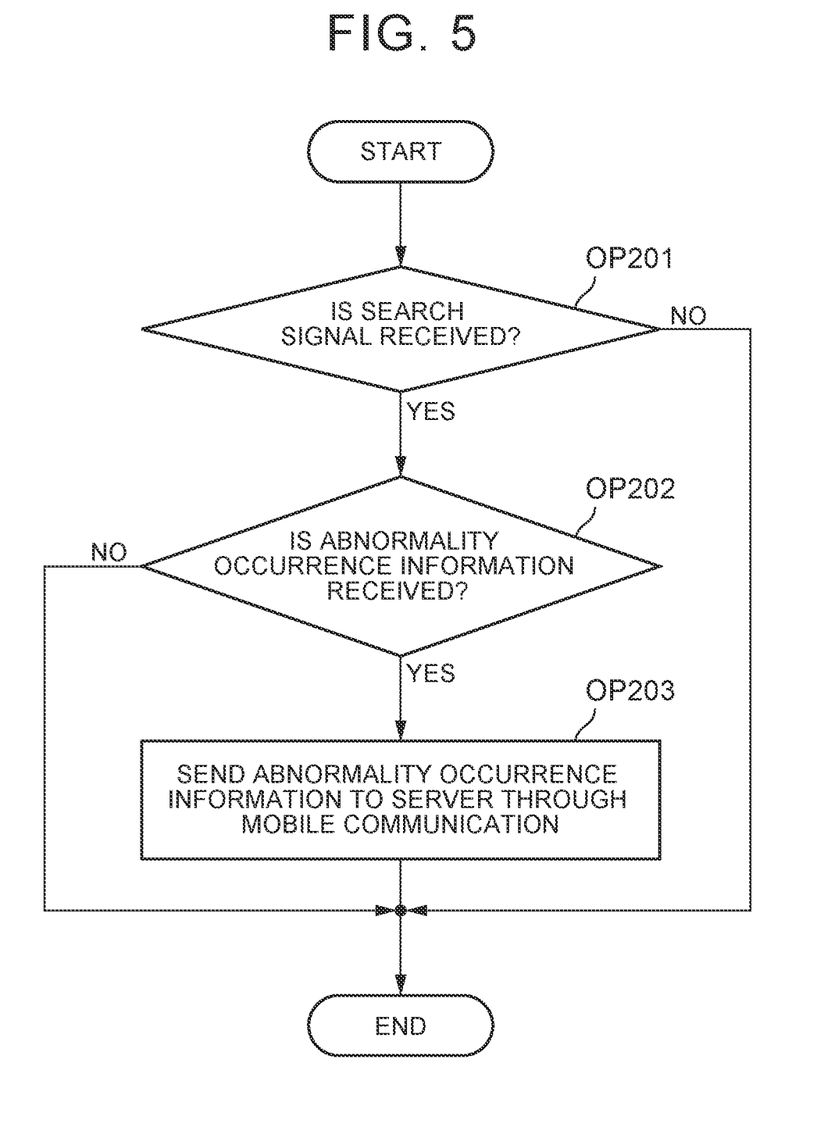
FIG. 5 is an example of a flowchart of processing of the mobile terminal according to the first embodiment.

FIG. 5 is an example of the flowchart of the processing of the mobile terminal 2 according to the first embodiment. The processing shown in FIG. 5 is repeatedly performed at a predetermined cycle while the mobile terminal 2 is operating. Although the processing shown in FIG. 5 is performed by the CPU of the mobile terminal 2, the processing is described as being performed by the functional components for the convenience of description.

In OP201, the control unit 22 determines whether the search signal sent through terminal-to-terminal direct communication is received. When search signal sent through terminal-to-terminal direct communication is received (OP201: YES), the processing proceeds to OP202. When the search signal sent through terminal-to-terminal direct communication is not received (OP201: NO), the processing shown in FIG. 5 is terminated.

In OP202, the control unit 22 determines whether the abnormality occurrence information and the proxy sending request are received through terminal-to-terminal direct communication. When the abnormality occurrence information and the proxy sending request are received (OP202: YES), the processing proceeds to OP203. When the abnormality occurrence information and the proxy sending request are not received (OP202: NO), the processing shown in FIG. 5 is terminated.

In OP203, the control unit 22 outputs the received abnormality occurrence information to the server communication unit 11 and, via the mobile communication unit, sends the abnormality occurrence information to the center server 4. After that, the processing shown in FIG. 5 is terminated.

Note that the processing of the in-vehicle device 1 and the mobile terminal 2 is not limited to the processing shown in FIG. 4 and FIG. 5. The processing of the in-vehicle device 1 and the mobile terminal 2 may appropriately be added, changed, or deleted according to the embodiment.

Figure 6:
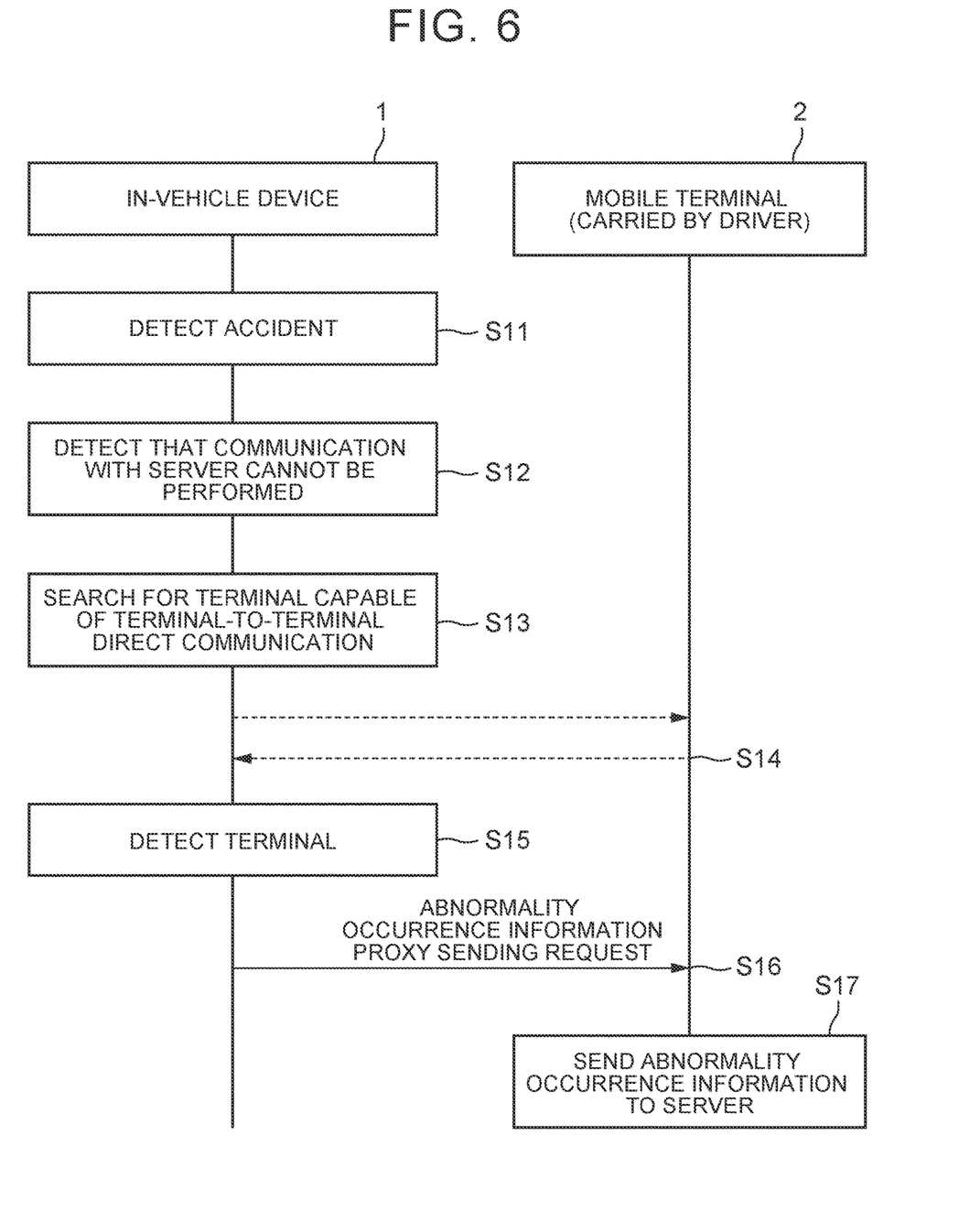
FIG. 6 is a diagram showing an example of a processing sequence between the in-vehicle device and the mobile terminal.

FIG. 6 is a diagram showing an example of the processing sequence of the in-vehicle device 1 and the mobile terminal 2. In FIG. 6, it is assumed that the mobile terminal 2 is a mobile terminal carried by the driver of the vehicle 3 on which the in-vehicle device 1 is mounted.

In S11, the vehicle 3 is involved in an accident and the in-vehicle device 1 detects the occurrence of the accident as an occurrence of an abnormality in the vehicle 3 (FIG. 4, OP101: YES). It is assumed that the antenna 301 in the vehicle 3, provided for mobile communication, is damaged by this accident.

In S12, the in-vehicle device 1 detects that communication with the center server 4 cannot be performed due to the damage of the mobile communication antenna 301 (FIG. 4, OP103: NO). In S13, the in-vehicle device 1 searches for a mobile terminal capable of terminal-to-terminal direct communication (FIG. 4, OP104). To search for a terminal through terminal-to-terminal direct communication, the search signal is sent from the in-vehicle device 1.

In S14, the mobile terminal 2 carried by the driver receives the search signal (FIG. 5, OP201: YES) and sends the response signal to the in-vehicle device 1. In S15, the in-vehicle device 1 receives the response signal from the mobile terminal 2 and detects the presence of the mobile terminal 2 (FIG. 4, OP106: YES). In S16, the in-vehicle device 1 sends the abnormality occurrence information and the proxy sending request to the mobile terminal 2 through terminal-to-terminal direct communication (FIG. 4, OP107). In S17, the mobile terminal 2 receives the abnormality occurrence information and the proxy sending request from the in-vehicle device 1 (FIG. 5, OP202: YES) and sends the abnormality occurrence information to the center server 4 (FIG. 5, OP203).

When the abnormality occurrence information is received, the center server 4 notifies the concerned authorities according to the abnormality details indicated by the abnormality occurrence information. When the notification is sent, the position information indicated by the abnormality occurrence information is also sent. As a result, it is possible to send the rescue team to the position of the vehicle 3. In the example shown in FIG. 6, the mobile terminal 2 of the driver is detected by the in-vehicle device 1. In some cases, the driver's mobile terminal may also be damaged by the accident and, in that case, the mobile terminal 2 carried by a pedestrian around the vehicle is likely to be detected. In such a case, the abnormality occurrence information is sent to the center server 4 in proxy mode by the mobile terminal 2 carried by the pedestrian.

Effects of First Embodiment

In the first embodiment, the in-vehicle device 1 detects an abnormality in the vehicle 3. In addition, when communication with the center server 4 cannot be performed, the in-vehicle device 1 sends the abnormality occurrence information and a proxy sending request to the mobile terminal 2 around the vehicle 3 through terminal-to-terminal direct communication. This allows the mobile terminal 2 around the vehicle 3 to send the abnormality occurrence information to the center server 4 in proxy mode. This means that, even when the in-vehicle device 1 cannot communicate with the center server 4, the abnormality occurrence information can be sent to the center server 4.

Other Embodiments

The above embodiment is merely an example, and the present disclosure can be implemented by adding appropriate modifications without departing from the spirit of the disclosure.

In the first embodiment, when communication with the center server 4 cannot be performed (mobile communication cannot be performed), the in-vehicle device 1 searches for a terminal around the vehicle 3 through terminal-to-terminal direct communication. When a terminal is detected, the in-vehicle device 1 sends the abnormality occurrence information and a proxy sending request to the detected terminal. Instead of this, when communication with the center server 4 cannot be performed (mobile communication cannot be performed), the in-vehicle device 1 may broadcast the abnormality occurrence information and the proxy sending request through terminal-to-terminal direct communication at a predetermined cycle for a predetermined period. As a result, it is possible to notify a terminal around the in-vehicle device 1 of the occurrence of the abnormality in the vehicle 3 and to request the terminal to send the abnormality occurrence information in proxy mode.

The processing and the units described in the present disclosure may be freely combined and implemented as long as no technical contradiction occurs.

The processing described as being performed by one device may be divided and executed by a plurality of devices. Conversely, the processing described as being performed by different devices may be performed by one device. In a computer system, the hardware configuration (server configuration) for implementing each function can be flexibly changed.

The present disclosure can also be implemented in such a way that computer programs for implementing the functions described in the above embodiment are supplied to a computer so that one or more processors of the computer can read the programs for execution. Such computer programs may be provided to the computer by a non-transitory computer-readable storage medium connectable to the computer system bus, or may be provided to the computer via a network. The non-transitory computer readable storage media include any type of disk, such as a magnetic disk (floppy (registered trademark) disk, hard disk drive (HDD), or the like.) and an optical disc (CD-ROM, DVD disc, Blu-ray disc, or the like), and any type of medium suitable for storing electronic instructions, such as a read-only memory (ROM), random access memory (RAM), EPROM, EEPROM, magnetic card, flash memory, and optical card.

What is claimed is:

1. An information processing device mounted on a vehicle, the information processing device comprising a processor configured to:
send abnormality occurrence information to a predetermined server through a first communication unit when an occurrence of an abnormality is detected in the vehicle, the abnormality occurrence information indicating the occurrence of the abnormality, the first communication unit being mounted on the vehicle and configured to perform communication via a base station using a first communication method;
send a proxy sending request to a terminal, the terminal being configured to communicate with a second communication unit by a second communication method, through the second communication unit when communication with the predetermined server cannot be performed through the first communication unit, the proxy sending request being a request to send the abnormality occurrence information to the predetermined server in proxy mode, the second communication unit being mounted on the vehicle and configured to perform communication using the second communication method that allows for terminal-to-terminal direct communication; and
broadcast the proxy sending request for a predetermined period when the communication with the predetermined server cannot be performed through the first communication unit.

2. The information processing device according to claim 1, wherein the second communication method includes one of inter-vehicle communication, Wi-Fi ad hoc mode, Bluetooth, and Bluetooth Low Energy.

3. The information processing device according to claim 1, wherein the abnormality occurrence information includes a type of the abnormality.

4. The information processing device according to claim 1, wherein the abnormality occurrence information includes position information regarding a position of the vehicle at a timing the occurrence of the abnormality is detected.

5. The information processing device according to claim 1, wherein the processor is configured to, when the communication with the predetermined server cannot be performed through the first communication unit:
search for the terminal; and
send the proxy sending request to the terminal detected by searching.

6. An information processing method comprising:
sending, by a computer mounted on a vehicle, abnormality occurrence information to a predetermined server through a first communication unit when an occurrence of an abnormality is detected in the vehicle, the abnormality occurrence information indicating the occurrence of the abnormality, the first communication unit being mounted on the vehicle and configured to perform communication via a base station using a first communication method;
sending, by the computer, a proxy sending request to a terminal, the terminal being configured to communicate with a second communication unit by a second communication method, through the second communication unit when communication with the predetermined server cannot be performed through the first communication unit, the proxy sending request being a request to send the abnormality occurrence information to the predetermined server in proxy mode, the second communication unit being mounted on the vehicle and configured to perform communication using the second communication method that allows for terminal-to-terminal direct communication; and
broadcasting, by the computer, the proxy sending request for a predetermined period when the communication with the predetermined server cannot be performed through the first communication unit.

7. The information processing method according to claim 6, wherein the second communication method includes one of inter-vehicle communication, Wi-Fi ad hoc mode, Bluetooth, and Bluetooth Low Energy.

8. The information processing method according to claim 6, wherein the abnormality occurrence information includes a type of the abnormality.

9. The information processing method according to claim 6, wherein the abnormality occurrence information includes position information regarding a position of the vehicle at a timing the occurrence of the abnormality is detected.

10. The information processing method according to claim 6, further comprising when the communication with the predetermined server cannot be performed through the first communication unit:
searching for, by the computer, the terminal; and
sending, by the computer, the proxy sending request to the terminal detected by searching.

11. A terminal comprising:
a first wireless communication unit configured to perform communication using a first communication method via a base station;
a second wireless communication unit configured to perform communication using a second communication method that allows for terminal-to-terminal direct communication; and
a processor configured to
receive a proxy sending request from an in-vehicle device through the second wireless communication unit, the proxy sending request being a request to send abnormality occurrence information to a predetermined server in proxy mode, the proxy sending request being a request broadcasted for a predetermined period, the abnormality occurrence information indicating an occurrence of an abnormality in a vehicle on which the in-vehicle device is mounted, and
send the abnormality occurrence information to the predetermined server through the first wireless communication unit.

12. The terminal according to claim 11, wherein the second communication method includes one of inter-vehicle communication, Wi-Fi ad hoc mode, Bluetooth, and Bluetooth Low Energy.

13. The terminal according to claim 11, wherein the abnormality occurrence information includes a type of the abnormality.

14. The terminal according to claim 11, wherein the abnormality occurrence information includes position information regarding a position of the vehicle at a timing the occurrence of the abnormality is detected.

15. A non-transitory storage medium storing instructions that are executable by one or more processors and that cause the one or more processors to perform functions comprising:
  receiving a proxy sending request from an in-vehicle device through a second wireless communication unit, the proxy sending request being a request to send abnormality occurrence information to a predetermined server in proxy mode, the proxy sending request being a request broadcasted for a predetermined period, the abnormality occurrence information indicating an occurrence of an abnormality in a vehicle on which the in-vehicle device is mounted, the second wireless communication unit being configured to perform communication using a second communication method that allows for terminal-to-terminal direct communication; and
  sending the abnormality occurrence information to the predetermined server through a first wireless communication unit, the first wireless communication unit being configured to perform communication using a first communication method via a base station.

16. The storage medium according to claim 15, wherein the second communication method includes one of inter-vehicle communication, Wi-Fi ad hoc mode, Bluetooth, and Bluetooth Low Energy.

17. The storage medium according to claim 15, wherein the abnormality occurrence information includes a type of the abnormality.

18. The storage medium according to claim 15, wherein the abnormality occurrence information includes position information regarding a position of the vehicle at a timing the occurrence of the abnormality is detected.

* * * * *